United States Patent [19]

McNaney

[11] 4,143,948
[45] Mar. 13, 1979

[54] LIGHT BEAM POSITION CONTROL SYSTEM

[76] Inventor: Joseph T. McNaney, 8548 Boulder Dr., La Mesa, Calif. 92041

[21] Appl. No.: 836,301

[22] Filed: Sep. 26, 1977

[51] Int. Cl.² .............................................. G02F 1/33
[52] U.S. Cl. .................................................. 350/358
[58] Field of Search ................... 350/355, 358; 332/7, 332/51

[56] References Cited

U.S. PATENT DOCUMENTS 4,004,847  1/1977  McNaney ............................. 350/358

Primary Examiner—William L. Sikes

[57] ABSTRACT

The system herein includes the use of a laser source of radiant energy and an acousto-optic light reflector and associated lens for controlling the output position of light from the source along a scan-line of the output surface of the system. But intermediate the reflector and output surface additional light reflection control means are utilized for effecting a compacting of an otherwise space consuming array of optical components.

2 Claims, 3 Drawing Figures

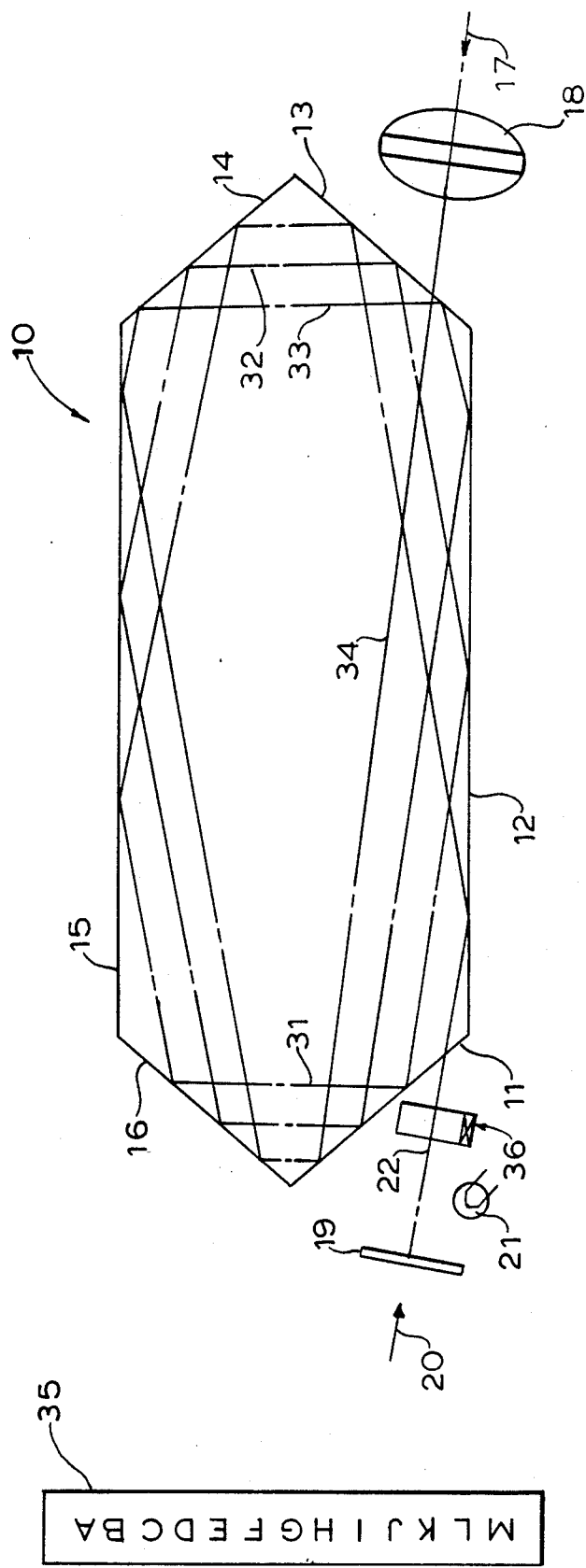

LIGHT BEAM POSITION CONTROL SYSTEM

BACKGROUND OF THE INVENTION

The invention includes the use of certain teachings set forth in the applicant's U.S. patent application Ser. No. 729,310 filed Oct. 4, 1976, and applicant's U.S. patent application Ser. No. 764,408 filed Jan. 31, 1977. Each of these inventions are directed toward an improving of the deflection sensitivity of light deflector means associated therewith and also toward compacting an otherwise space consuming array of optical components.

SUMMARY OF THE INVENTION

Light, preferably from a laser source, and in the form of radiant energy extending from ultraviolet, through the visible spectrum, to infrared, can be directed by means of an acousto-optic light reflector, for example, toward a light admitting surface of an array of light reflecting surfaces of the system. Upon entering the light will be allowed to follow, selectively, any one of a plurality of optical paths each extending to a predetermined scan-line position of a light emitting surface of the array of reflecting surfaces. Intermediate the light reflector and the input light a mask having window means, or light reflecting areas, representative of message characters, such as letters, numerals, etc., is provided to transform the cross section of the input light to character shaped beams of light whereby meaningful orders of these beams may be directed toward a common reference position of the system. From this latter position individual images of a given order of beams will be established in a line across a display or record medium. Intermediate the acousto-optic reflector and the common reference position at which the images of the message characters are established a compact array of light reflecting surfaces is utilized which includes a predetermined arrangement of such surfaces wherein each is angularly oriented so as to establish an optical relationship one with respect to the other for allowing a beam of light to follow optical paths forming a helix of plural revolutions. The space requirements intermediate the reflector and the reference position is thereby reduced considerably. A preferred embodiment herein shows, by way of example only, the means of meeting such objectives of the invention. The description which follows, when read in connection with the drawings hereof, will provide a better understanding of these objectives of the invention as well as other advantages included therein.

BRIEF DESCRIPTION OF THE DRAWING

FIG. 2 is a diagram which represent a view of the compact array of light reflecting surfaces of which only portions are shown in the diagram of FIG. 1;

FIG. 3 is representative of a character forming mask which will be referred to in descriptions of FIGS. 1 and 2.

DESCRIPTION OF THE INVENTION

Figure 1:
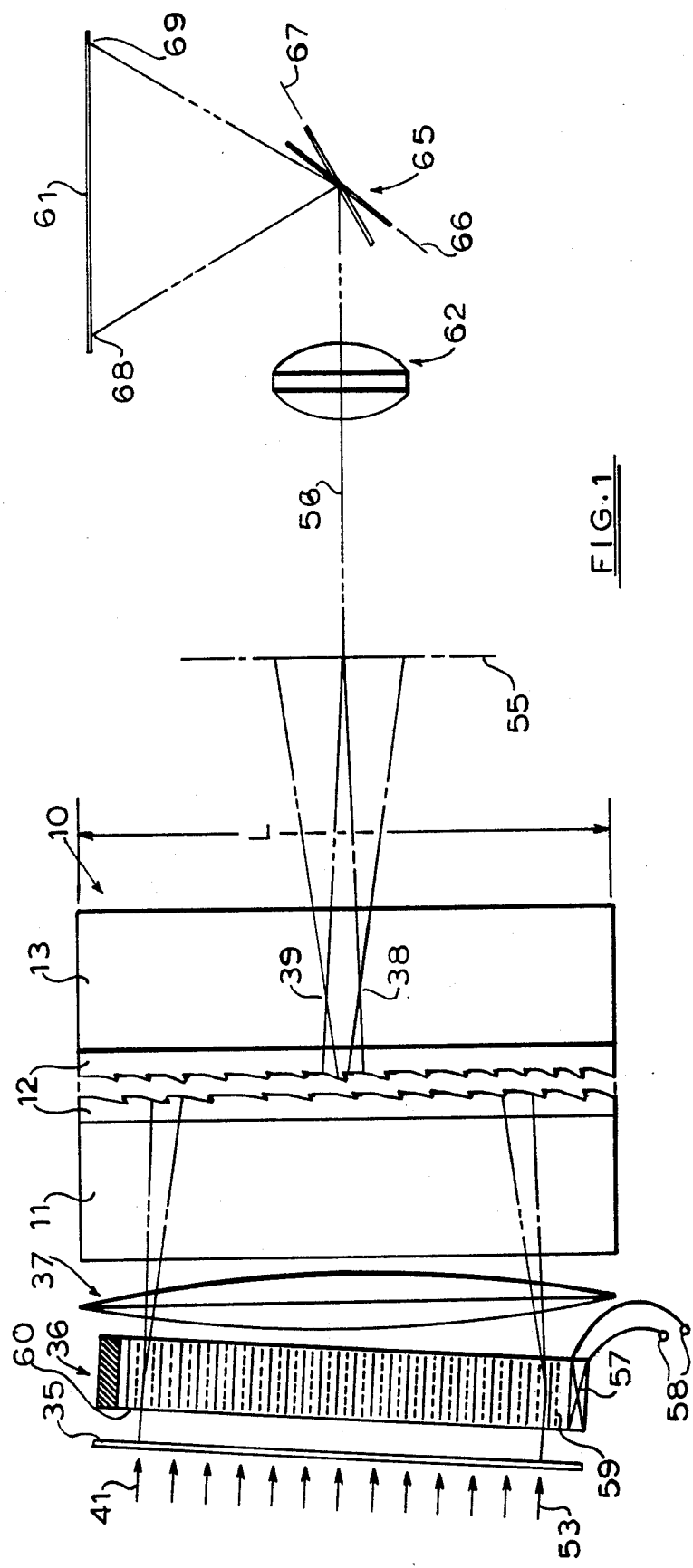
FIG. 1 is a diagram illustrating an embodiment of the invention wherein message characters may be generated and presented on a display or record medium.

Referring to FIGS. 1 and 2, first and second views are illustrated, respectively, representative of an arrangement of light reflecting surfaces which will be referred to as a light guide member 10. An end view thereof in FIG. 2 shows member 10 as having six light reflecting surfaces 11, 12, 13, 14, 15 and 16. A side view of the member 10 in FIG. 1, however, has been drawn to show only small sections of the surface 12 along with the surfaces 11 and 13. The member 10 can be understood as being a good light conductor, such as glass or a plastic material, within an air environment and not to be limited to the use of the six surfaces illustrated. And, of course, each of the drawings represent disproportionate illustrations and in most instances drawn greatly enlarged so as to simplify the descriptions thereof. The invention can also include the use of more, or less, than the number of surfaces as indicated, which may also be supported independently of a common member 10, but still meeting the objectives of the invention.

Operation of member 10 can be described by following the optical path of a point source of light as viewed in the direction of the arrow 17 through a lens system 18. The source of light can be the result of light passing through a mask 19 from the direction of the arrow 20, or the result of light being reflected from the surface of the mask 19 from a source of light 21. Light reaching the lens 18 follows an input path 22 through the surface 11 toward surface 12, then reflected from surface 12 toward surface 13, reflected therefrom toward surface 14, reflected therefrom toward surface 15, reflected therefrom toward surface 16 and thereupon reflected toward surface 11 so as to complete the first revolution of light along a segment 31 of what will be referred to as the primary optical path through the member 10. This initial segment is followed by segments 32 and 33 which extend to the lens 18 along an output segment 34. The light reflecting surfaces 11 through 16 of member 10 are each angularly oriented so as to establish an optical relationship one with respect to the other for allowing light at the source to be viewed through the lens 18 along a path through member 10 forming a a helix of plural revolutions. Light incident upon surface 13 along the output segment 34 is at an angle sufficiently small enough to permit viewing through the surface 13 and along the optical axis of the lens system 18.

Referring now to the system embodiment of FIG. 1, a mask 35 is positioned in the path of light and it will be understood as having a series of window means as shown, for example, in FIG. 3 wherein the window means are representative of a series of letters through which light will pass. Each of the letter shaped windows in the mask 35, letters A through M, will be illuminated by a corresponding one of a series of light beams along input light paths 41 to 53. The invention is not to be limited in this regard since the mask 35 can include many times this number of different character shaped window means. The system disclosed in the aforementioned patent application Ser. No. 764,408 can be considered as a most appropriate source of light in meeting the requirements of the present invention. Intermediate the mask 35 and the member 10 there is shown an acousto-optic device 36 and a lens system 37 which, in combination, allow character shaped light beams, as they are exposed to a source of light, to be focused along any one of a number of scanline positions extending from an initial position 38 to an end of the line position 39. At an areal plane position 55 along an output optical axis 56 of the system the character shaped light beams, as they are selectively illuminated at the mask 35, will coincide with the optical axis 56 as a result of ultrasonic frequency voltages are applied to a transducer means 57 through appropriate terminals 58. There is a direct relationship between exposure of a given letter in the mask 35, the frequency of the input voltage, and the placement of the shaped beam on the axis 56 at the plane 55. Each letter shaped beam upon reaching the input surface 11 of the member 10 will follow the helix of plural revolutions through the member 10 as hereinbefore described in connection with FIG. 2.

Although the focal points 38 through 39 are illustrated so as to coincide with the output surface 13 certain design considerations may require these scan-line positions, as well as the areal plane position 55, to be established within the light reflecting limits of the member 10. An acousto-optic device may be utilized in a manner necessary to provide cylindrical lensing effects in the process of establishing acoustic wave effects 59 in the interaction medium 60 and thereby modify the requirements of the lens system 37.

Intermediate a display or record medium 61 and the areal plane 55 a lens system 62 is provided as a means of presenting an image of the letter shaped beams at the surface of the medium 61 as they appear at the intersection of the axis 56 and the plane 55, and intermediate the medium 61 and the lens system 62 a light reflecting mirror 65, shown in first and second positions 66 and 67, is used to present the beams between opposite line positions 68 and 69 at the surface of the medium 61.

Although the array of surfaces of the member 10 may include more or less than the six surfaces illustrated in FIG. 1, in each case such an array will be considered as having a length dimension L which will accommodate the line of window means in the mask 35, and it is along this length dimension that the scan-line position of focal points 38 through 39 will be established, either within the limits of the member 10, coincident with and along the output surface 13, or beyond the limits of member 10 reflecting surfaces.

It should be understood by those skilled in the arts pertaining to the construction and application possibilities of the invention herein set forth that the embodiments included herein illustrate in a very limited sense the usefulness of the invention, and that the invention includes other modifications and equivalents as they may be seen by those sillled in the arts, but still being within the scope of the appended claims.

I claim:

1. In a message character display system:
   (a) a primary source of light;
   (b) light mask means for providing an array of message characters and means for exposing message characters of said array, selectively, to light from said primary source for providing any one of a plurality of individual message character shaped sources of light;
   (c) a message character display medium;
   (d) said array of message characters and said display medium positioned, respectively, at first and second ends of message character shaped light beam optical paths of said system;
   (e) optical means positioned along an optical axis of said system intermediate said array of message characters and said display medium for projecting an image of a message character selectively exposed to light from said primary source toward a predetermined character display position at said display medium, said display position representative of a reference position at said display medium;
   (f) acousto-optic light deflector means including an interaction medium and acoustic wave generator means for establishing any of a number of different acoustic wave light deflecting conditions within said medium thereof, said interaction medium positioned intermediate said array of message characters and said optical means positioned along said optical axis;
   (g) means for exposing a predetermined one of said message characters of said array to light from said primary source and establishing, simultaneously, a predetermined one of said light deflecting conditions within said interaction medium for allowing said display medium to be exposed to a light image of said predetermined one of said message characters through said optical means and coincident with said reference position at said display medium;
   (h) means for exposing another predetermined one of said message characters to light from said primary source and establishing, simultaneously, another predetermined one of said light deflecting conditions within said interaction medium for allowing said display medium to be exposed to a light image of said other predetermined one of said message characters through said optical means and coincident with said reference position at said display medium.

2. The invention as set forth in claim 1, additionally including adjustable light reflector means intermediate said optical means along said optical axis and said display medium for allowing said display medium to be exposed to said light image of said other predetermined one of said message characters at any one of a plurality of secondary display positions thereon in relation to said reference position.

* * * * *